INVENTORS
YUNGSHU WU &
RICHARD H. YEN
BY John V. Regan
Attorney

INVENTORS
YUNGSHU WU & RICHARD H. YEN
BY John V. Regan
Attorney

CODE TRANSLATOR

Filed May 22, 1961

INVENTORS
YUNGSHU WU &
RICHARD H. YEN

BY John V. Regan
Attorney

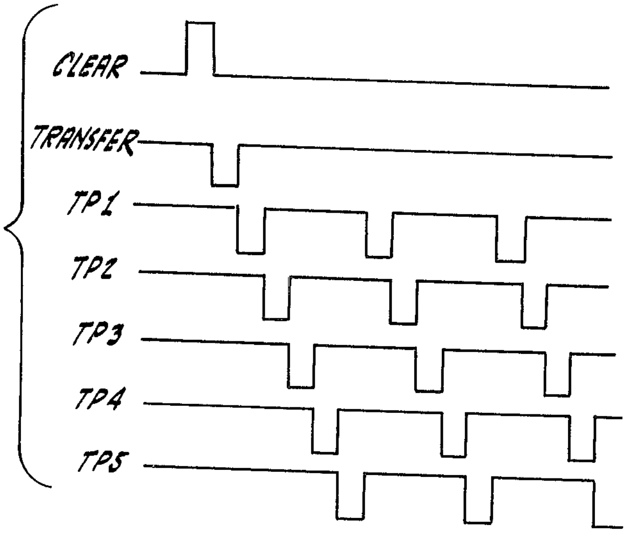
FIG. 4.
FIG. 5.
| LINE # | $2^9$ | $2^8$ | $2^7$ | $2^6$ | $2^5$ | $2^4$ | $2^3$ | $2^2$ | $2^1$ | $2^0$ |
|---|---|---|---|---|---|---|---|---|---|---|
| 1 | 0 | 0 | 0 | 0 | 0 | 0 | 0 | 1 | 1 | 1 |
| 2 | 0 | 0 | 0 | 0 | 0 | 0 | 1 | 1 | 1 | 1 |
| 3 | 0 | 0 | 0 | 0 | 0 | 1 | 0 | 0 | 0 | 1 |
| 4 | 0 | 0 | 0 | 0 | 0 | 1 | 1 | 0 | 1 | 1 |
| 5 | 0 | 0 | 0 | 0 | 1 | 0 | 0 | 1 | 0 | 1 |
| 6 | 0 | 0 | 0 | 1 | 1 | 0 | 0 | 1 | 0 | 1 |
| 7 | 0 | 0 | 1 | 0 | 0 | 0 | 0 | 1 | 0 | 1 |
| 8 | 0 | 0 | 1 | 0 | 0 | 0 | 1 | 0 | 0 | 1 |
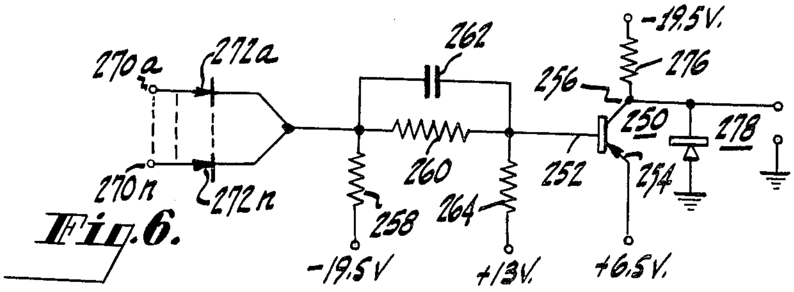
FIG. 6.
INVENTORS
YUNGSHU WU &
RICHARD H. YEN
BY John V. Regan
Attorney

United States Patent Office 3,237,185

Patented Feb. 22, 1966

3,237,185

CODE TRANSLATOR

Richard H. Yen, Haddonfield, N.J., and Yungshu Wu, Baltimore, Md., assignors to Radio Corporation of America, a corporation of Delaware Filed May 22, 1961, Ser. No. 111,727
7 Claims. (Cl. 340—347)

This invention relates to apparatus for translating a number expressed in a first binary code to its equivalent in another binary code and, more particularly, though not exclusively, to apparatus for translating a number expressed in a first binary code to its equivalent in pure binary notation.

Different types of digital information handling equipment may employ different binary coding schemes for number representation. In order to communicate with such an equipment, it is necessary that the information supplied to that equipment be coded in the "language" or code of that equipment. For example, if the address and information supplied by a sender equipment are expressed in a code which is different from that of the receiver equipment, it is necessary to translate the incoming information to the language of the receiver equipment.

It is an object of this invention to provide a binary code translator.

It is another object of this invention to provide apparatus for translating information from a first binary code to a second binary code, pure binary for example.

It is still another object of this invention to provide apparatus for translating, into pure binary notation, a multi-digit number having a radix X and represented in a first binary code by groups of binary bits, one group for each digit of the number.

According to one embodiment of the invention, signals representing the binary bits of a number are applied at the input of the translator. A binary output register is provided for storing the number in pure binary notation. The input signals which represent the bits of the digit of lowest order, or significance, are transmitted to corresponding storage positions in the output register. Those stages or positions in the output register which correspond to the pure binary equivalents of the quantities $X^1$, $X^2$ . . . $X^n$ are triggered, respectively, a number of times equal to the binary values of the corresponding digits of higher order.

In the accompanying drawing, like reference characters refer to like components, and:

Figure 3A:
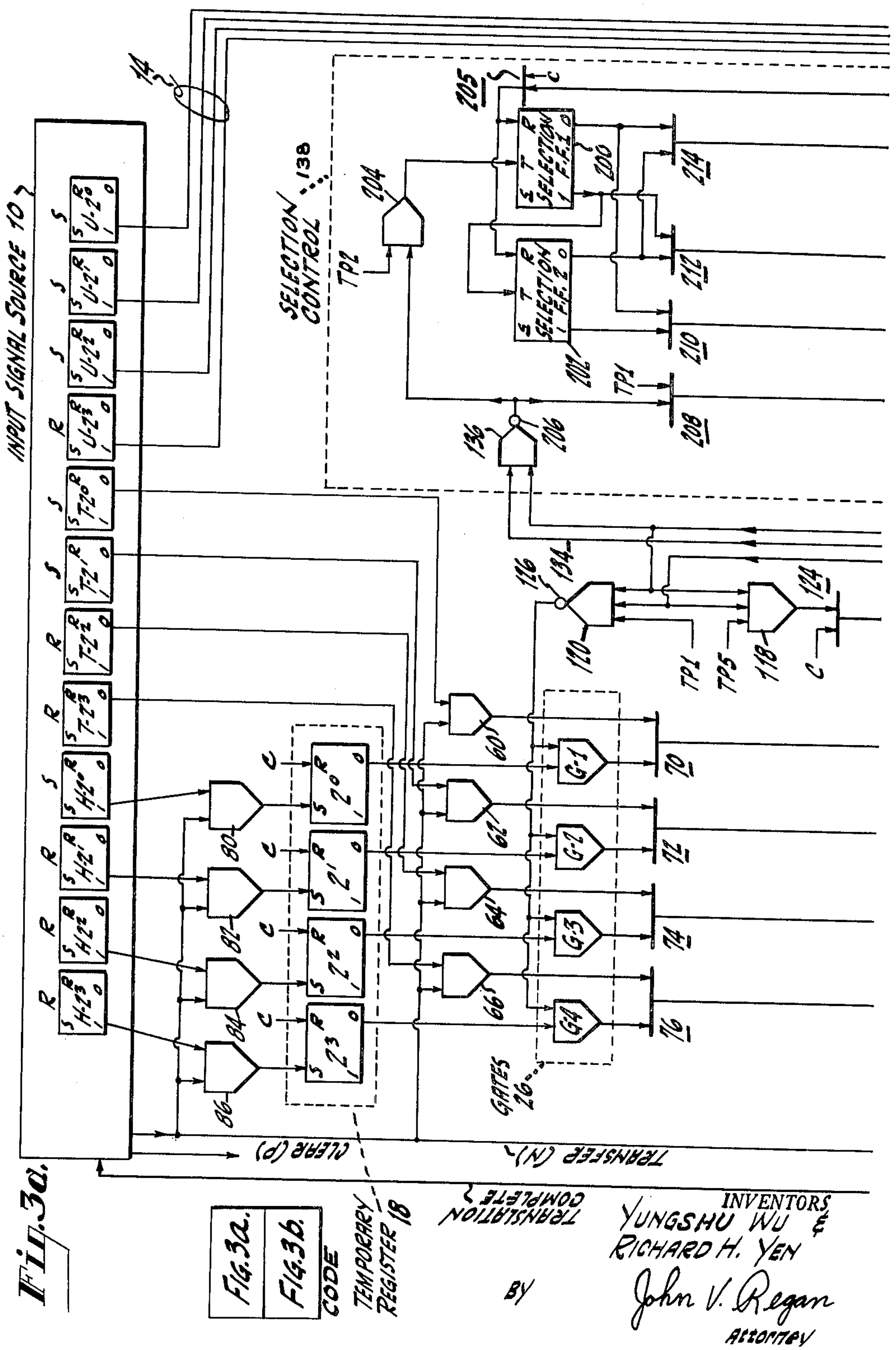

FIGURE 3(*a*) and 3(*b*) together make up FIGURE 3, which is a detailed block diagram of a binary coded decimal to pure binary code translator;

FIGURE 4 is a set of waveforms of certain signals which initiate control of the operation of the FIGURE 3 translator;

FIGURE 5 is a table which indicates the information stored in the output register of the FIGURE 3 translator at various times during the translation; and FIGURE 6 is a schematic circuit diagram of a "nor" gate suitable for use in practicing the invention.

Multidigit numbers frequently are represented in either binary coded decimal or binary coded octal form in a digital information handling system in order to eliminate certain problems connected with the storage and transfer of information. Other systems of number representation, such as binary coded duodecimal, also are employed, although less frequently. A multidigit number is represented in any of the number systems aforementioned by groups of binary bits, one group for each digit of the number. Apparatus according to the invention may be used to translate a multidigit number from one binary code to another. In particular, apparatus according to the present invention may be used to translate a multidigit number, of any radix X, into an equivalent representation in pure binary notation. As is known, a number expressed in binary coded octal translates directly to pure binary notation without the need for special translating apparatus.

The term "pure binary" is synonymous with "natural binary," as the latter term is defined at page 45 of the book entitled, "Digital Computer Primer," published in 1959 by the McGraw-Hill Book Company, Inc. The reader is referred to chapter 4 of this book for a detailed discussion and explanation of number systems and binary coding schemes, and the various factors which enter into the choice of any particular scheme. Suffice it to say that a number is represented in pure binary notation by a single group of binary "one" and "zero" bits, the position of any bit in the group having an order to the base 2. That is to say, the "ones" and "zeros" in a pure binary number, starting at the decimal point and reading in the direction of increasing order (right to left in the usual notation) or significance, indicate the presence or absence, respectively, of $2^0$, $2^1$, $2^2$ . . . $2^n$. The number 10110, for example, has the value $0+2^1+2^2+0+2^4$, which is equal to 22 in decimal notation.

It may be helpful to a better understanding of the invention to establish certain relationships between two selected number systems, chosen for illustrative purposes. Consider by way of example the decimal number 137, which may be represented by $(137)_{10}$, and the duodecimal number 137, that is, the number 137 to the radix 12, which may be represented as $(137)_{12}$. The decimal equivalent of $(137)_{12}$ is $$(1\times12^2)+(3\times12^1)+(7\times12^0)=187$$

The binary coded decimal and the binary coded duodecimal representations, respectively, of the numbers $(137)_{10}$ and $(137)_{12}$, and the pure binary equivalents thereof are as follows:

| Number | (a) Binary coded decimal<br>(b) Binary coded duodecimal | | | | Pure Binary |
|---|---|---|---|---|---|
| $(137)_{10}$<br>$(137)_{12}$ | (a)<br>(b) | 0001<br>0001 | 0011<br>0011 | 0111<br>0111 | 10001001<br>10111011 |

The binary coded decimal and binary coded duodecimal systems are mixed radix notations, that is, they are binary within each digit and decimal or duodecimal, respectively, from one digit to another. A binary "one" bit may be represented in an information handling system by a pulse or level of one polarity, and a binary "zero" may be represented by a pulse or level of the opposite polarity, or the absence of a pulse.

Figure 1:
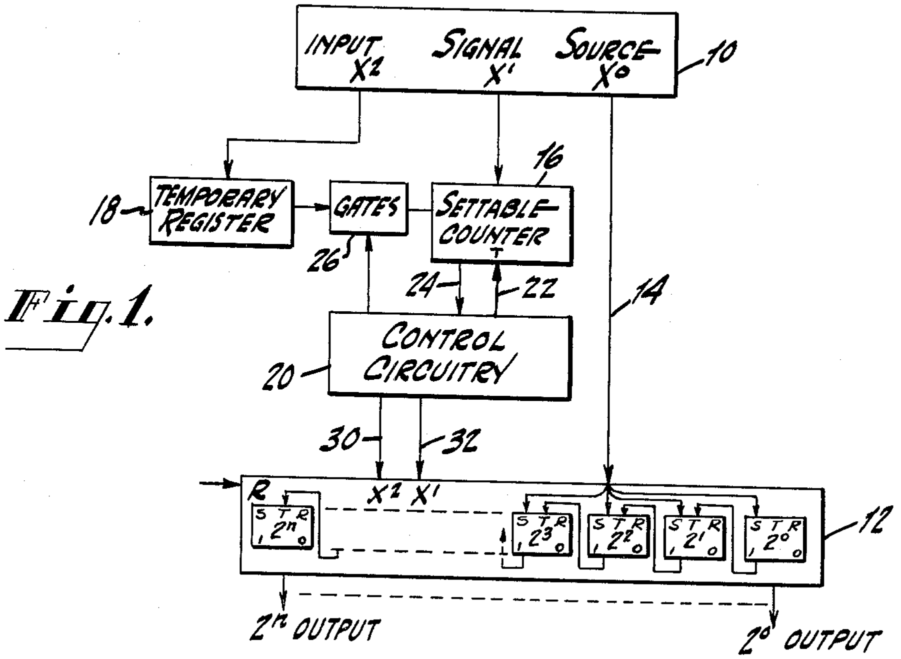
FIGURE 1 is a simplified block diagram of the invention.

FIGURE 1 is a simplified block diagram of a code translator according to the invention for translating a three-digit number having a radix X and expressed in a first binary code to its equivalent representation in pure binary notation. For example, the number to be translated may be expressed in a binary coded decimal form, in which case $X=10$, or the number may be expressed in binary coded duodecimal, in which case $X=12$. A signal input source 10, which may be a digital computer or other sender equipment, supplies binary coded signals representative of the multidigit number to be translated.

A binary register 12 is provided for storing the translated number in pure binary notation. This register 12, which may be, for example, a chain of cascaded binary trigger circuits, is illustrated as having a common reset (R) terminal to which the reset inputs of the individual trigger circuits are connected. The register 12 also has input terminals labeled ($X^2$) and ($X^1$), and separate input terminals connected to the set (S) terminals of the $2^0 \ldots 2^3$ stages of the register 12. It will be apparent from the description hereinafter that these latter input terminals could be connected, alternatively, to the trigger (T) terminals of the $2^0 \ldots 2^3$ stages. Binary coded input signals representing the $X^0$ digit, or digit of least significance, are transmitted over multichannel lines 14 to the input terminals which are connected to the set (S) inputs of corresponding ones of the $2^0 \ldots 2^3$ stages of the output register 12.

Binary coded signals representing the $X^1$ digit, or digit of next higher order of the number, are transmitted to a settable counter 16. Binary coded signals representing the $X^2$ digit, the digit of highest order in the illustrative embodiment, are transmitted to a temporary register 18 which may be, for example, a plurality of independently operable bistable elements, such as flip-flops. If the input signals are binary coded decimal signals, for example, the $X^0$ digit is the unit's digit; the X1 digit is the ten's digit; and the $X^2$ digit is the hundred's digit.

The settable counter 16 receives control signals at its trigger input terminal from control circuitry, shown for convenience as a single block 20, by way of a line 22. Signals are supplied to the control circuitry 20 from the counter 16 over a line 24. The arrows on these and other lines of the drawing indicate the direction of information or control signal flow. A plurality of gates represented by a single block 26 are connected between the outputs of the temporary register 18 and corresponding inputs of the settable counter 16, and controlled by signals from the control circuitry 20. Other signals from the control circuitry 20 are transmitted over lines 30 and 32 to the ($X^2$) and ($X^1$) input terminals, respectively, of the output register 12.

Those stages in the output register 12 which correspond to the pure binary equivalent of the radix X have their trigger inputs connected (not shown) to the ($X^1$) input terminal. In like maner, those stages in the output register 12 which correspond to the binary equivalent of $X^2$ have their trigger inputs connected (not shown) to the ($X^2$) input terminal. The binary coded signals corresponding to the digit $X^0$ set the proper ones of the $2^0 \ldots 2^3$ stages of the register 12 directly to store the same digit. Signals from the control circuitry 20 are applied cyclically over line 32 to trigger those stages in the register 12 which correspond to the pure binary equivalent of the radix X. The pure binary number stored in the register 12 is increased by an amount X each trigger cycle.

The settable counter 16 is triggered from the control circuitry 20 once each cycle until a predetermined count is reached by the counter 16. The counter 16 sends a signal over the line 24 to the control circuitry 20 when the predetermined count is reached. The control circuitry 20 responds to this signal by sending an enabling signal to the gates 26 to open the gates 26, effecting a transfer of the number stored in the temporary register 18 to the settable counter 16. The signal from the settable counter also effects a change in the logical operation of the control circuitry to cause the control circuitry to send signals cyclically over the line 30 to the ($X^2$) input terminal of the output register 12. The number in the output register 12 then is increased by an amount $X^2$ each trigger cycle. The settable counter 16 is triggered once over line 22 each cycle until the predetermined count aforementioned is again reached. The counter 16 then sends another signal over line 24 to the control circuitry 20 to terminate the cyclic triggering of the output register 12. The pure binary equivalent of the number to be translated is stored in the output register at this time.

In actual practice, it is desirable that those stages in the output register 12 which correspond to X be triggered serially timewise, highest order first, during each cycle of triggering in order to avoid interference between the trigger input signals and the information being propagated in the register 12. This also applies to the triggering of the stages which correspond to $X^2$. To accomplish this desired mode of triggering, each of the input terminals ($X^1$) and ($X^2$), illustrated as single input terminals, actually may comprise a plurality of separate input terminals with the trigger (T) terminal of only one stage connected to any one of the input terminals. Signals may be applied sequential to these terminals from the control circuitry 20 over multichannel lines 32, 30, respectively. This feature will be described in greater detail in connection with the system illustrated in FIG. 3.

Operation of the FIGURE 1 apparatus may be understood by considering two specific examples. Assume first that it is desired to translate the number $(137)_{10}$, which number is expressed as 0001, 0011, 0111 in binary coded decimal form in the input signal source 10. The radix X of this decimal number is ten, and $X^2=100$. The set terminals of the $2^0 \ldots 2^3$ stages are connected to the outputs of corresponding stages in the input signal source 10 by multichannel cable 14. The trigger terminals of the $2^3$ and $2^1$ stages in the output register 12 are connected to the ($X^1$) input terminal; the trigger terminals of the $2^6$, $2^5$ and $2^2$ stages are connected to the ($X^2$) input terminal. Initially all of the stages in the output register 12 are reset.

Signals representing the binary coded decimal units digit 0111 are transmitted from the input source 10 over multichannel lines 14 to set approximate ones of the $2^3$, $2^2$, $2^1$ and $2^0$, i.e., the $2^2$, $2^1$ and $2^0$ stages of the register 12. The register 12 then stores the pure binary equivalent of the decimal seven ,which is identical to the binary coded decimal representation thereof. Signals representing binary coded decimal 0011, the ten's digit, are transmitted from the input source 10 to the settable counter 16; signals representing binary coded 0001, the hundred's digit of the number, are transmitted to the temporary register 18. The control circuitry 20 operates cyclically to supply trigger pulses to the ($X^1$) input terminal of the register 12 and to trigger the counter 16 once each cycle. Triggering of the $2^3$ and $2^1$ stages of the register 12 each cycle has the effect of increasing the number stored in the register 12 by ten (i.e., 8+2). At the end of three triggering cycles, the number 37 is stored in the register 12, and the counter reaches the predetermined count, zero in this case (assuming, for example, a reversible counter or a counter which may be complemented after the ten's digit is inserted, or a counter wherein the digit is inverted before being supplied to the counter). The number stored in the temporary register 18 then is transferred to the counter 16 by way of the gates 26.

The signal supplied to the control circuitry 20 from the counter 16 changes the logical operation of the control circuitry 20, whereby trigger pulses are applied cyclically at the ($X^2$) input terminal of the register 12. Each such trigger cycle increases the number stored in the register 12 by one hundred because the $2^6$, $2^5$ and $2^2$ stages are triggered (i.e., 64+32+4). The counter 16 is triggered once each cycle and, in this example, reaches the predetermined count of zero after one cycle. The signal supplied to the control circuitry 20 over line 24 then prevents further triggering of the register 12. The binary number $(10001001)_2=(137)_{10}$ then is stored in the register 12; this may be verified as follows:

| Inputs to Register | Stages Triggered or Set | | $2^7$ | $2^6$ | $2^5$ | $2^4$ | $2^3$ | $2^2$ | $2^1$ | $2^0$ |
|---|---|---|---|---|---|---|---|---|---|---|
| (0111) | $2^2, 2^1, 2^0$ | = | ---- | 0 | 0 | 0 | 0 | 1 | 1 | 1 |
| ($X^1$) | $2^3, 2^1$ | = | ---- | 0 | 0 | 0 | 1 | 0 | 1 | 0 |
| ($X^1$) | $2^3, 2^1$ | = | ---- | 0 | 0 | 0 | 1 | 0 | 1 | 0 |
| ($X^1$) | $2^3, 2^1$ | = | ---- | 0 | 0 | 0 | 1 | 0 | 1 | 0 |
| ($X^2$) | $2^6, 2^5, 2^2$ | = | ---- | 1 | 1 | 0 | 0 | 1 | 0 | 0 |
| | | | 1 | 0 | 0 | 0 | 1 | 0 | 0 | 1 |

Assume now that it is desired to translate $(137)_{12}$ to pure binary notation. This number $(137)_{12}$ has the decimal equivalent of $(187)_{10}$, as discussed previously. However, the binary coded duodecimal representation of the number $(137)_{12}$ is the same as the binary coded decimal representation of $(137)_{10}$. To effect translation of a duodecimal number (radix=12), the trigger inputs of the $2^3$ and $2^2$ stages of the register 12 are connected to the $(X^1)$ input terminal. Accordingly, a trigger pulse applied at the $(X^1)$ input terminal triggers the $2^3$ and $2^2$ stages to increase the number stored in the register by twelve (i.e., 8+4). The $2^7$ and $2^4$ stages of the register 12 have their trigger inputs connected to the $(X^2)$ input terminal. Accordingly, a trigger pulse applied at the $(X^2)$ input terminal increases the number stored in the register 12 by one hundred and forty-four.

As in the example above, the $2^2$, $2^1$ and $2^0$ stages of the register 12 first are set directly by signals applied over line 14 from the input source 10. Three trigger pulses are applied cyclically at the $(X^1)$ input terminal, followed by a single trigger pulse at the $(X^2)$ input terminal, The pure binary number $(10111011)=(137)_{12}$ then is stored in the register 12; this may be verified as follows:

| Inputs to Register | Stages Triggered or Set | $2^7$ | $2^6$ | $2^5$ | $2^4$ | $2^3$ | $2^2$ | $2^1$ | $2^0$ |
|---|---|---|---|---|---|---|---|---|---|
| (0111) | $2^2, 2^1, 2^0$ | 0 | 0 | 0 | 0 | 0 | 1 | 1 | 1 |
| $(X^1)$ | $2^3, 2^2$ | 0 | 0 | 0 | 0 | 1 | 1 | 0 | 0 |
| $(X^1)$ | $2^3, 2^2$ | 0 | 0 | 0 | 0 | 1 | 1 | 0 | 0 |
| $(X^1)$ | $2^3, 2^2$ | 0 | 0 | 0 | 0 | 1 | 1 | 0 | 0 |
| $(X^2)$ | $2^7, 2^4$ | 1 | 0 | 0 | 1 | 0 | 0 | 0 | 0 |
| | | 1 | 0 | 1 | 1 | 1 | 0 | 1 | 1 |

Although the apparatus of FIGURE 1 has been described with particular reference to the translation of decimal and duodecimal numbers to pure binary, it will be understood that numbers having other radices also may be translated, provided these numbers are represented by groups of binary bits, one group for each digit, as discussed previously. Moreover, the numbers may be translated to a second binary code other than the pure binary. Also, the apparatus is not limited to the translation of three-digit numbers. Numbers of more than three digits may be translated by providing additional temporary registers and gates, and by extending the control circuitry. The manner of extending the control circuitry will be apparent from a description of the more detailed system of FIGURE 3.

Figure 2:
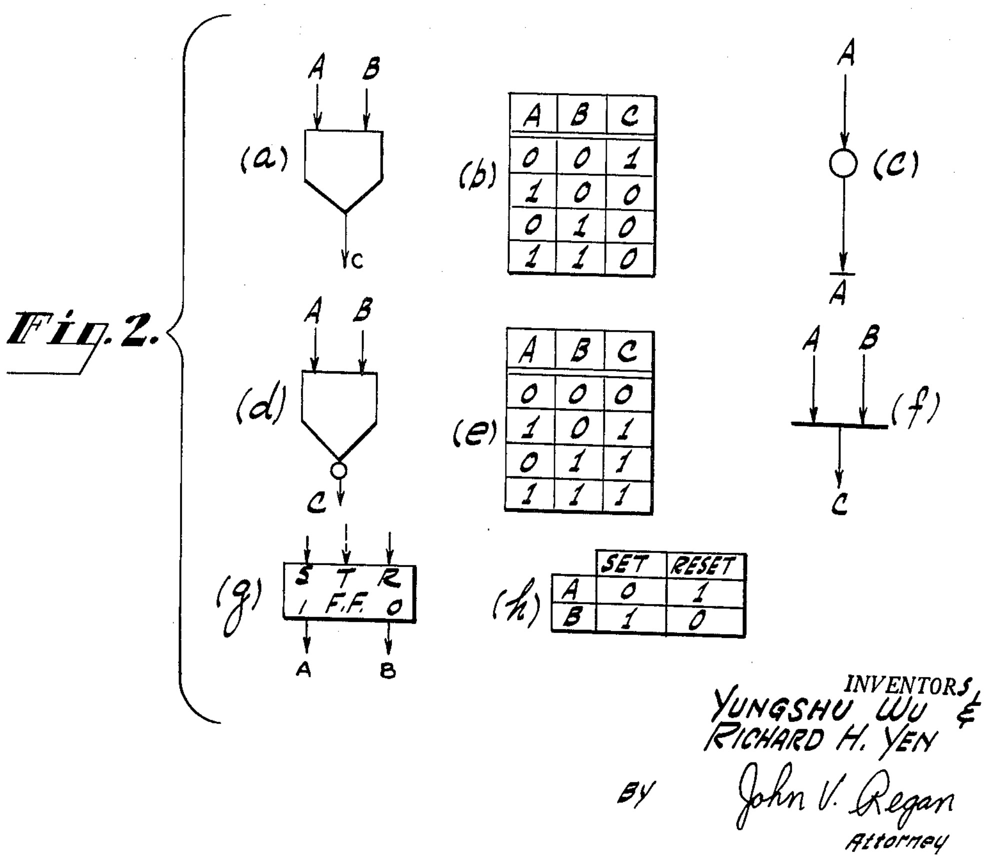
FIGURE 2 is a set of symbols of components used in the drawing.

Certain symbols and components used in the FIGURE 3 circuit are illustrated in FIGURE 2 and will now be described. FIGURE 2(*a*) is the symbol used to represent a "nor" gate. A "nor" gate may be defined as a gate having two or more inputs and one output, characterized in that the output is a binary "one" only when all of the inputs are binary "zeros." The "truth" table for a "nor" gate is given in FIGURE 2(*b*). It will be recognized from the "truth" table that a "nor" gate performs the same logical operation as the combination of an "or" gate followed by an inverter.

The symbol for an inverter circuit is illustrated in FIGURE 2(*c*). An inverter may be defined as a circuit which has one input and one output, wherein the output always has the opposite sense of the input. In more general terms, the output is $\bar{A}$, meaning "not A," when the input is A.

The symbol used in the drawing for a "nor" gate followed by an inverter is illustrated in FIGURE 2(*d*). The "truth" table for such a combination is given in FIGURE 2(*e*). This combination performs the same logical operation as an "or" gate, the symbol for which is illustrated in FIGURE 2(*f*).

The symbol for a bistable multivibrator or flip-flop is illustrated in FIGURE 2(*g*). A flip-flop is a circuit which has two stable states, two inputs (S) and (R), and two corresponding outputs (1) and (0), respectively. The flip-flop may be set by applying a positive pulse at the (S) input terminal, and reset by a positive pulse applied at the (R) input terminal. The (1) output is high, corresponding to a binary "1," and the (0) output is low, corresponding to a binary "0," when the flip-flop is in the reset state. The outputs change sense when the flip-flop is switched to the set state. The outputs of the flip-flop for the two operating conditions are given in the table of FIGURE 2(*h*).

The flip-flop also may have a trigger (T) input terminal and means for steering pulses applied at this terminal (T) to trigger the flip-flop from its present operating state to the other operating state. For example, if the flip-flop originally is in the set state, the first pulse of positive polarity applied at the trigger (T) terminal switches the flip-flop to the reset state. The next trigger pulse switches the flip-flop back to the set state, etc. Several triggerable flip-flop stages may be cascaded, in known fashion, to provide a register, such as the output register 12 of FIGURE 1.

Figure 3B:
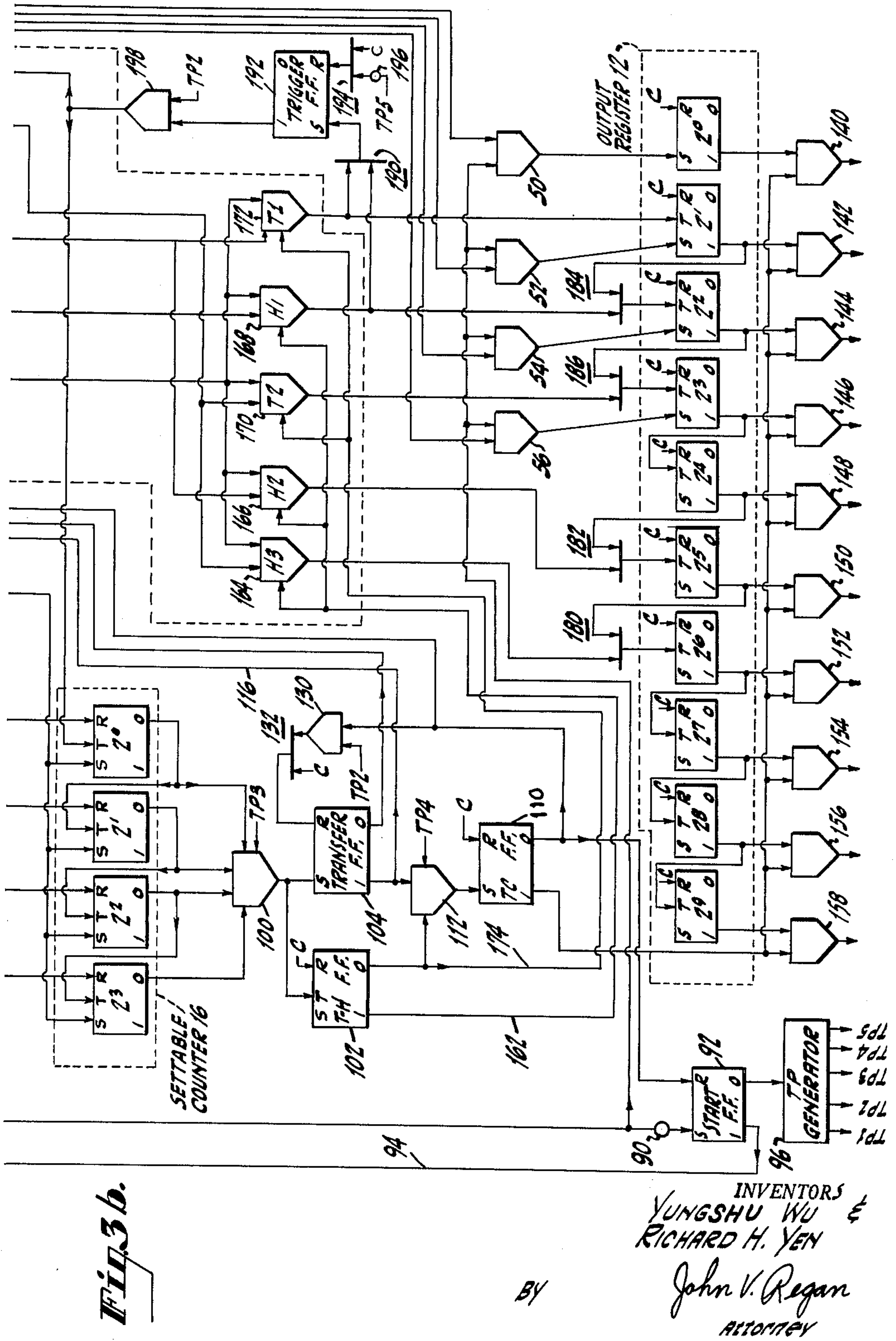

FIGURE 3 is a detailed block diagram of a preferred embodiment of the invention for translating a three-digit number from binary coded decimal form to an equivalent representation in pure binary notation. FIGURE 3 comprises FIGURES 3(*a*) and 3(*b*) which may be viewed together by placing FIGURE 3(*a*) above FIGURE 3(*b*). Various ones of the major components illustrated in FIGURE 1 are delineated in FIGURE 3. The input signal source 10, for example, is illustrated at the top of FIGURE 3(*a*); the temporary register 18 is shown at the upper left of FIGURE 3(*a*); the settable counter 16 is located in the upper left-hand corner of FIGURE 3(b), and; output register 12 is located at the bottom of FIGURE 3(*b*). The gates 26 are located at the lower left of FIGURE 3(*a*) and labeled $G_1 \ldots G_4$. The remainder of the FIGURE 3 drawing may be considered as comprising the control circuitry 20 of FIGURE 1.

The information signal source 10, which in itself forms no part of the invention, may be a digital computer, program control unit or other type of digital information handling apparatus which provides binary coded decimal signals representative of a multidigit decimal number to be translated. The input signal source 10 also provides two control signals, labeled "Clear (P)" and "Transfer (N)," to be described more fully hereinafter. (N) and (P) denote negative and positive, respectively, and indicate the relative polarity or sense of the control signals. For purposes of illustration only, the input signal source 10 is illustrated as including a plurality of independent flip-flop stages for storing the number to be translated in binary coded decimal form. Four of these flip-flops, labeled $U2^0 \ldots U2^3$, store the unit's digit of the number; the flip-flops labeled $T2^0 \ldots T2^3$ store the ten's digit of the number; and the flip-flops labeled $H2^0 \ldots H2^3$ store the hundred's digit of the number to be translated.

The (1) output terminals of the $U2^0 \ldots U2^3$ flip-flops in the input signal source 10 are connected by way of a multichannel cable 14 to the set (S) input terminals of the $2^0 \ldots 2^3$ flip-flop stages, respectively, in the output register 12 by way of individual two-input "nor" gates 50 . . . 56, respectively. The transfer (N) control signal from the input signal source 10 is applied as a second input to each of these "nor" gates 50 . . . 56. The (0) outputs of the flip-flops $T2^0 \ldots T2^3$ in the input signal source 10 are connected to the reset (R) input terminals of the $2^0 \ldots 2^3$ stages, respectively, in the settable counter 16 by way of two-input "nor" gates 60 . . . 66, respectively, and two-input "or" gates 70 . . . 76, respectively. A second input to each of the "nor" gates 60 . . . 66 is the transfer (N) signal output of the input signal source 10. The transfer (N) signal output of the input signal source 10 also is applied as one input to each of a set of "nor" gates 80 . . . 86. The (1) outputs of the $H2^0 \ldots H2^3$ flip-flops in the input signal source 10 are connected, respectively, to the other inputs of these "nor" gates 80 . . . 86, the outputs of which are connected, respectively, to the set (S) terminals of the $2^0 \ldots 2^3$ flip-flops in the temporary register 18. The (0) output terminals of the $2^0 \ldots 2^3$ stages in the temporary register 18 are connected by way of the "nor" gates $G_1 \ldots G_4$, respectively, and the "or" gates 70 . . . 76, respectively, to the reset input terminals of corresponding stages in the settable counter 16.

The transfer (N) control signal from the input signal source 10 also is applied to an inverter circuit 90, the output of which is connected to the (S) input terminal of a "Start" flip-flop 92 (FIGURE 3*b*). The (1) output of this flip-flop 92 is connected by way of a line 94 to the input signal source 10 for signalling completion of the translation operation at an appropriate time. The (0) output of the Start flip-flop 92 is connected to the input of a timing pulse generator 96, which generates series of timing pulses $TP_1 \ldots TP_5$. The timing pulse generator 96 may be, for example, an oscillator followed by a tapped delay line, or any other generator of spaced pulses.

Each of the (0) outputs of the stages in the settable counter 16 is connected to the trigger (T) input terminal of the stage of next-higher order, or significance, and also to a different input of a five-input "nor" gate 100. The (0) output of a stage is low, corresponding to a binary "0" when the flip-flop is in the reset stage. Accordingly, the "nor" gate 100 provides a positive output in response to a negative timing pulse $TP_3$ only when all of the flip-flops in the counter 16 are reset. The output of the "nor" gate 100 is connected to the trigger (T) input terminal of a "Ten's-Hundred's" flip-flop 102 and to the set (S) input terminal of a "Transfer" flip-flop 104. The Ten's-Hundred's flip-flop is so-named because it controls the triggering of the output register 12 by either ten or one hundred, depending upon the state of the flip-flop 102. The Transfer flip-flop is so-named because it controls transfer of the contents of the temporary register 18 to the settable counter 16.

The (1) output terminal of the Transfer flip-flop 104 is connected to the set (S) input terminal of a "Translation Complete" (TC) flip-flop 110 by way of a three-input "nor" gate 112. The other two inputs to this "nor" gate 112 are the $TP_4$ timing pulse and the (0) output of the Ten's-Hundred's flip-flop 102. The (1) output terminal of the Transfer flip-flop 104 also is connected by way of a line 116 to one input of a three-input "nor" gate 118 and to one input of a three-input "nor" gate 120. Each of the gates 118, 120 receives a second input from the (0) output of the TC flip-flop 110. Timing pulses $TP_1$ and $TP_5$ are applied to the third inputs of the gates 120, 118, respectively. The output of the "nor" gate 118 is connected by way of an "or" gate 124 to the set (S) input terminals of all of the stages in the settable counter 16. The output of the other "nor" gate 120 is connected to an inverter 126, the output of which is applied to an input of each of the gates $G_1 \ldots G_4$.

The (0) output terminal of the TC flip-flop 110 is connected (1) to the reset input terminal of the Start flip-flop 92, (2) to one input of a "nor" gate 130, the output of which is applied to the reset terminal of the Transfer flip-flop 104 through an "or" gate 132, and (3) to a two-input "nor" gate 136, the other input of which is connected by a line 134 to the (0) output terminal of the Transfer flip-flop 104. The latter "nor" gate 136, for convenience of later description, may be considered part of a "selection control" circuitry 138, the purpose of which is to control the sequence of triggering of the stages in the output register 12.

The output reigster 12 includes 10 bistable stages in the present example, ten stages being sufficient to store in pure binary notation the equivalent representation of any three-digit decimal number. All of the stages except the $2^0$ stage are triggerable, and the $2^1 \ldots 2^9$ stages are cascaded by connecting the (1) output terminal of each of these stages to the trigger (T) input terminal of the stage of next-higher order. Some of these connections are made direct, and some of the connections are made by way of "or" gates. Each of the (1) output terminals of the register 12 stages is connected to the input of a different one of a plurality of two-input "nor" gates 140 . . . 158. Each of these latter gates has a second input terminal connected to the (1) output terminal of the TC flip-flop 110.

The Ten's-Hundred's flip-flop 102 controls the triggering of the register 12 stages so as to increase the number stored in the register 12 by either ten or one hundred. The (1) output terminal of this flip-flop 102 is connected by way of a line 162 to one input of each of a plurality of three-input "nor" gates 164, 166 and 168 in the selection control circuitry 138, which gates are designated $H_3$, $H_2$ and $H_1$, respectively, in the drawing. The (0) output terminal of the flip-flop 102 is connected by way of a line 174 to one input of each of a pair of three-input "nor" gates 170, 172, designated $T_2$ and $T_1$, respectively in the drawing. The output of the $H_3$ "nor" gate 164 is applied to the trigger (T) of the $2_6$ stage in the register 12 by way of an "or" gate 180. The outputs of the $H_2$ "nor" gate 166 and the $H_1$ "nor" gate 168 are applied, respectively, to the trigger (T) inputs of the $2_5$ and $2_2$ storage stages by way of "or" gates 182, 184, respectively. The outputs of the $T_2$ "nor" gate 170 and the $T_1$ "nor" gate 172 are applied to the trigger (T) inputs of the $2^3$ and $2^1$ stages, the former stage receiving its trigger input by way of an "or" gate 186.

The outputs of the $H_1$ and $T_1$ "nor" gates 168 and 172 also are connected to different inputs of an "or" gate 190, the output of which is applied to the set (S) input terminal of a "Trigger" flip-flop 192. The Trigger flip-flop 192 is so-named because it controls the triggering of the settable counter 16 and the selection flip-flops, to be described. The reset (R) terminal of the Trigger flip-flop 192 is connected to the output of an "or" gate 194. The "or" gate 194 receives the "Clear (P)" signal from the input signal source 10 at one input, and receives the timing pulse $TP_5$ at another input by way of an inverter circuit 196. The (1) output of the Trigger flip-flop 192 and the $TP_2$ timing pulse are applied to different inputs of a "nor" gate 198. The output of this gate 198 triggers the $2^0$ stage of the settable counter 16, and resets each of a pair of "Selection" flip-flops 200, 202 by way of an "or" gate 205. The other input to this "or" gate is the "Clear (P)" control signal. The Selection flip-flop 200 is triggered by the output of a "nor" gate 204 at $TP_2$ whenever the output of the inverter circuit 206 is low. The output of the inverter circuit 206 also is applied to one input of each of the $T_1$, $T_2$ and $H_1 \ldots H_3$ gates 164 . . . 172 by way of an "or" gate 208, the other input of which is the $TP_1$ timing pulse. The (0) output terminal of the Selection flip-flop 200 is connected to one input of each of a pair of "or" gates 210, 214. The (1) output terminal of this flip-flop 200 is connected to the Trigger (T) input terminal of the other Selection flip-flop 202 and to one input of an "or" gate 212. The (0) output terminal of the latter flip-flop 202 is connected to the other input of the "or" gates 212, 214, and the (1) output terminal of this flip-flop 202 is connected to the other input terminal of the "or" gate 210.

The "or" gate 210 primes one input of the $H_1$ gate 168 whenever the Selection flip-flops 200 and 202 are reset and set, respectively. The "or" gate 212 primes one input of each of the $H_2$ and $T_1$ gates 166 and 172 whenever the Selection flip-flops 200 and 202 are set and reset, respectively. The "or" gate 214 primes one input of each of the $H_3$ and $T_2$ gates 164 and 170 whenever the Selection flip-flops 200 and 202 are both reset.

The "Clear (P)" control signal from the input signal source (1) resets all of the stages in the temporary register 18; (2) sets all of the stages in the settable counter 16 by way of the "or" gate 124; (3) resets the TC flip-flop 110 and the Ten's-Hundred's flip-flop 102; (4) resets all of the stages in the output register 12; (5) resets the Transfer flip-flop 104 by way of the "or" gate 132. The purpose of the "Clear (P)" control pulse is to prepare the translator to receive the binary coded information from the input signal source 10. The "Clear (P)" pulse is followed by the transfer (N) pulse, the function of which will be described in detail hereinafter. The aforementioned control pulses are illustrated in FIGURE 4.

The negative-going Transfer (N) pulse sets the Start flip-flop 92, and the high output at the (0) output terminal thereof energizes the timing pulse generator 96. The generator 96, when so energized, generates sets of timing pulses $TP_1 \ldots TP_5$, illustrated in FIGURE 4. The generator 96 continues to generate timing pulses until the Start flip-flop 92 is reset by the TC flip-flop 110 at the completion of a translation operation.

Operation of the translator may best be understood by considering a typical example. Assume that it is desired to translate the decimal number 137 to pure binary notation. $(137)_{10}$ is represented in binary coded decimal form as follows: 0001, 0011, 0111. It will be assumed that the number is stored in binary coded decimal form in the storage stages of the input signal source 10. The operating states of the storage elements in the input source 10 when storing the decimal number 137 are indicated by the letters "S" and "R" above the storage elements, where "S" indicates the set state and "R" indicates the reset state. The (0) output of a flip-flop is high when a flip-flop is set and low when reset. The (1) outputs have the opposite sense.

Operation is commenced by sending the aforementioned "Clear (P)" control signal from the input signal source 10, followed by the Transfer (N) pulse. The transfer (N) control signal performs the following functions: (1) partially enables each of the "nor" gates 50 . . . 56, whereby the information stored in the $U2^0 \ldots U2^3$ stages of the input source 10 is transferred to the $2^0 \ldots 2^3$ stages of the output register 12. The output register 12 then stores the decimal number 7 in pure binary notation (see line 1, FIGURE 5); (2) partially enables each of the "nor" gates 60 . . . 66, whereby the information stored in the ten's stages $T2^0 \ldots T2^3$ of the input source 10 is gated to the settable counter 16 by way of the "or" gates 70 . . . 76 (the $2^3$ and $2^2$ stages of the settable counter 16 are then in the reset state and the $2^1$ and $2^0$ stages are in the set state); and (3) partially enables the "nor" gates 80 . . . 86 whereby the information stored in the hundred's stages of the input source 10 is transferred to the temporary register 10 (the $2^0$ stage of the register 18 is set).

The $T_1$ and $T_2$ gates 172, 170 are primed by the (0) output of the Ten's-Hundred's flip-flop 102. The $T_2$ gate 170 receives a second priming signal from the output of the "or" gate 214 at this time because both of the Selection flip-flops are reset. The $TP_1$ timing pulse then activates the gate $T_2$ by way of the "or" gate 208, and the positive-going output of the $T_2$ gate 170 triggers the $2^3$ stage in the output register 12 (line 2, FIGURE 5). The $TP_2$ timing pulse triggers the Selection flip-flop 200 by way of the "nor" gate 204. The output of the "or" gate 212 is then low. The next $TP_1$ timing pulse is passed by the "or" gate 208, and fully enables the $T_1$ gate 172, the output of which triggers the $2^1$ stage of the output register 12 to the reset state. The high output at the (1) terminal thereof triggers the $2^2$ stage to the reset state by way of the "or" gate 184. The high output at the (1) terminal of the $2^2$ stage triggers the $2^3$ stage to the reset state by way of the "or" gate 186, and the high output at the (1) terminal of the $2^3$ stage triggers the $2^4$ stage to the set state (line 3, FIGURE 5).

The output of the $T_1$ gate 172 also sets the Trigger flip-flop 192 by way of the "or" gate 190. The (1) output of this flip-flop 192 partially enables the "nor" gate 198 and, at $TP_2$, the gate 198 output resets the Selection flip-flops 200, 202 and triggers the $2^0$ stage of the settable counter 16 to the reset state. The Trigger flip-flop 192 is reset at $TP_5$, terminating the first cycle of triggering of the output register 12. It is to be noted that a cycle of operation for increasing the number stored in the register 12 by decimal 10 requires two sets of timing pulses $TP_1 \ldots TP_5$. During this cycle of operation, the stages in the output register 12 are triggered cyclically, the $2^3$ stage first, and then the $2^1$ stage. By cyclically triggering the register 12 stages in sequence, interaction between the trigger pulses and the information being propagated in the register 12 is avoided.

The triggering cycle described above is repeated a number of times determined by the initial setting of the settable counter 16. In the present example, three triggering cycles are required to reset all of the stages of the settable counter 16. At the end of the second cycle of operation, the $2^0$ stage of the counter 16 is set and the high output at the (0) output terminal thereof triggers the $2^1$ stage in the counter 16 to the reset state. All of the stages in the settable counter 16 except the $2^0$ stage are then in the reset state. The number stored in the output register 12 at the end of the second triggering cycle is indicated on line 4 of FIGURE 5.

At the end of the third triggering cycle, the number stored in the output register is as indicated on line 5 of FIGURE 5. The $2^0$ stage of the settable counter 16 is triggered to the reset state at $TP_2$. All of the stages in the counter 16 are then reset. The $TP_3$ timing pulse activates the "nor" gate 100, connected to the (0) output terminals of the counter 16, and the output of the "nor" gate 100 sets the Transfer flip-flop 104 and triggers the Ten's-Hundred's flip-flop 102 to the set state. The low output at the (1) terminal of the Transfer flip-flop 104 primes a second input of the "nor" gate 118, and at $TP_5$, the output of this gate 118 goes high, setting all of the stages in the counter 16. The high output at the (0) output terminal of the Transfer flip-flop 104 disables the "nor" gate 136 in the selection control circuit 138 to prevent triggering of any of the stages in the output register 12, temporarily.

The next $TP_1$ timing pulse causes the output of the "nor" gate 120 to go high. This gate 120 output is inverted and applied as a low level priming input to each of the gates $G_1 \ldots G_4$. The information stored in the temporary register 18 then is transferred by the gates $G_1 \ldots G_4$ and corresponding "or" gates 70 . . . 76, respectively, to corresponding stages of the counter 16, causing the $2^3$, $2^2$ and $2^1$ stages of the counter 16 to be reset. The next $TP_2$ timing pulse is passed by the "nor" gate 130 and "or" gate 132 to reset the Transfer flip-flop 104. The (0) output of this flip-flop 104 then fully enables the "nor" gate 136 in the selection control circuit 138.

The low output at the (1) output terminal of the Ten's-Hundred's flip-flop 102 partially enables the gates $H_1$, $H_2$ and $H_3$ in the selection control circuit 138. The next $TP_1$ timing pulse is passed by the $H_3$ gate 164 and the "or" gate 180 to trigger the $2^6$ stage in the output register 12. The information stored in the register 12 after this triggering is indicated on line 6 of FIGURE 5. The next $TP_2$ timing pulse triggers the Selection flip-flop 200 to the set state, and the resulting low output of the "or" gate 212 then partially enables the $H_2$ gate 166. The next $TP_1$ timing pulse is passed by the "or" gate 208 to activate the $H_2$ gate 166, and the high output thereof triggers the $2^5$ stage of the output register 12 by way of the "or" gate 182. The information stored in the output register 12 then is indicated on line 7 of FIGURE 5. The next $TP_2$ timing pulse triggers the Selection flip-flop 200 to the reset state, and the high output at the (1) output terminal thereof triggers the other Selection flip-flop 202 to the set state. Both inputs to the "or" gate 210 then are low, and the gate 210 provides a low input to the $H_1$ gate 168.

The next $TP_1$ timing pulse is passed by the "or" gate 208 and activates the $H_1$ gate 168. The high output of the $H_1$ gate 168 triggers the $2^2$ stage of the output register 12 by way of the "or" gate 184. The information then stored in the register 12 is indicated on line 8 of FIGURE 5, and will be recognized as the pure binary equivalent of the decimal number 137. The output of the $H_1$ gate 168 also sets the Trigger flip-flop 192, and the (1) output thereof goes low. The $TP_2$ timing pulse activates the "nor" gate 198, the output of which then resets the Selection flip-flops 200, 202 and triggers the $2^0$ stage of the settable counter 16. All of the counter 16 stages then are reset, and the (0) outputs thereof are low. Accordingly, at $TP_3$, the "nor" gate 100 provides a positive-going output pulse which sets the Transfer flip-flop 104, and triggers the Ten's-Hundred's flip-flop 102 to the reset state. The (1) and (0) outputs of the flip-flops 104, 102, respectively, partially enable the "nor" gate 112. This gate 112 provides a positive output in response to the $TP_4$ timing pulse for setting the TC flip-flop 110. The low output at the (1) output terminal of the TC flip-flop 110 enables the set of "nor" gates 140 . . . 158 at the output of the register 12 for gating the information stored in the register 12. The high output at the (0) terminal of the TC flip-flop 110 resets the Start flip-flop 92 to disable the TP generator 96 and prevent further triggering of the output register 12. The high output at the (1) terminal of the Start flip-flop 92 is fed back to the input signal source 10 to indicate that the translation is complete.

Although the FIGURE 3 apparatus is illustrated and described as a binary coded decimal to pure binary translator, it will be understood by those skilled in the art that a system of this general type may be used to provide translation of numbers expressed in other binary codes to the pure binary equivalent or to a different binary code, for example translation between binary coded decimal and binary coded duodecimal, by suitable modification of the selection control circuitry 138 and connections to the trigger inputs of selected stages in the register 12. Translation from one radix to a higher radix involves a "subtraction" operation, that is, triggering stages in the output register down instead of up and, for this reason, the apparatus is best adapted for translating from a first radix to the equivalent in a lower radix. It will also be understood that numbers of greater than three digits may be translated by extending the control circuitry and providing sufficient temporary storage for the digits of higher order.

FIGURE 6 is a schematic circuit diagram of a "nor" gate suitable for use in practicing the present invention. The circuit includes a transistor 250 having base 252, emitter 254, and collector 256 electrodes. The combination of a resistor 258, a parallel resistor 260-capacitor 262 network and another resistor 264 is serially connected, in the order named, from a first source of voltage, designated −19.5 volts, to a second source of voltage designated +13 volts. The base electrode 252 is connected to the series combination at the junction of the resistor 264 and the parallel resistor 260-capacitor 262 network. A plurality of input terminals 270*a* . . . 270*n* are connected to the other end of the resistor 260-capacitor 262 network by way of individual unidirectional coupling devices, indicated as diodes 272*a* . . . 272*n*, respectively. The collector electrode 256 is connected to the −19.5 volt bias source by way of a load resistor 276. A clamping diode 278 is connected between the collector electrode 256 and a point of reference potential, indicated by the conventional symbol for circuit ground.

A binary "0" signal is represented in the system by a pulse or level having an amplitude of zero volts, and a binary "1" is represented by a pulse or a level having an amplitude of approximately +6.5 volts. The values of the various components in the base 252 input circuit are selected so that the diodes 272*a* . . . 272*n* are reverse biased when all of the inputs are binary "0." The voltage at the base electrode 252 then is sufficiently less positive than +6.5 volts to bias the transistor 250 into heavy conduction. The voltage at the collector electrode 256 then is only slightly less positive than the +6.5 volts at the emitter electrode 254. Whenever any input rises to +6.5 volts, corresponding to a binary "1," the associated diode becomes forward biased, and the voltage at the base electrode 252 goes more positive than +6.5 volts and biases the transistor 250 off. The diode 278 clamps the voltage at the collector electrode 256 at zero volts when the transistor 250 is nonconducting. It is thus seen that the logic of the FIGURE 6 circuit is the same as that given by the "truth" table of FIGURE 2*b*.

The FIGURE 6 circuit also may be operated as an Inverter circuit by disconnecting all but one of the diode inputs. Consider, for example, that only the input terminal 270*a* is connected to receive an input signal and that all of the other input terminals are disconnected, or "floating." The voltage at the base electrode 252 is less than +6.5 volts whenever a binary "0" signal is applied at the input terminal 270*a*. The transistor 250 conducts and the voltage at the collector electrode 256 is approximately +6.5 volts, corresponding to a binary "1." On the other hand, the voltage at the base electrode 252 is more positive than +6.5 volts when a binary "1" signal is applied at the input terminal 270*a*. The transistor 250 then is nonconducting and the collector electrode 256 is clamped at zero volts, corresponding to a binary "0," by the clamping diode 270*a*.

To "nor" circuits of the type illustrated in FIGURE 6 may be arranged as a flip-flop by suitably cross-coupling the base and collector electrodes, and the flip-flop may be made triggerable in a known manner by adding an input pulse steering circuit.

An "or" gate suitable for use in practicing the invention may comprise the combination of a "nor" gate of the type illustrated in FIGURE 6 followed by an inverter circuit of the type described. These circuits, of course, are given by way of example only and it will be understood that other suitable gating circuits may be used.

What is claimed is:

1. Apparatus for translating a number having a radix X into pure binary code, said number being represented in a first binary code by groups of binary bits, one group for each digit of said number, comprising: means providing groups of input signals in said first code representing said number; a binary register; means applying the input signals representing the lowest order digit of said number to corresponding stages of said register; a settable counter connected to receive the others of said input signals, on command, parallel by group; control means for cyclically triggering those stages in said register which correspond to $X^n$ in pure binary code, where $n$ is the order of the group last received by said counter and for triggering said counter once each cycle; and means responsive to a predetermined count in said counter for reading a new group of signals into said counter and for initiating the cyclic operation of said control means.

2. Apparatus for converting a number of radix X into binary code comprising, in combination: means providing binary coded input signals representing the digits of said numbers; a register comprising a plurality of cascaded binary trigger stages; means applying the input signals representing the lowest order digit of said number to the corresponding stages of said register; a settable counter connected to receive the others of said signals, digit-by-digit, on command; cyclically operative control means connected to trigger the stages in said register corresponding to $X^n$, where $n$ is the order of the digit last received by said counter, and for triggering said counter once each cycle; and means responsive to a predetermined count in said counter for transferring the input signals representing the next higher order digit to said counter and for initiating the cyclic operation of said control means.

3. Apparatus for converting a multidigit number of radix X into pure binary code comprising, in combination: means providing binary coded signals representing the individual digits of said number; a binary output register; means applying the input signals representing the lowest order digit to the corresponding stages of said output register; a settable counter connected to receive the input signals corresponding to the digit of next-to-lowest significance; a temporary storage connected to receive signals corresponding to a still higher order significant digit; cyclically and sequentially operative control means settable to trigger the stages in said output register which correspond to $X^n$, where $n$ is the order of the digit last received by said counter, and for triggering said counter once each cycle; and means responsive to a predetermined count in said counter for transferring the contents of said temporary storage to said counter and for controlling the setting of said control means.

4. Apparatus for translating a number having a radix X into pure binary code, said number being represented in a first binary code by groups of binary digits, one group for each digit of said number, comprising: means providing groups of input signals in said first code representing said number; a binary register; means applying the input signals representing the lowest order digit of said number to corresponding stages of said register; a settable counter connected to receive the others of said input signals, on command, parallel by group; logic control means for cyclically triggering those stages in said register which correspond to $X^k$ in pure binary code, where $k$ is the order of the digit represented by the group last received by said counter, and for triggering said counter once each cycle; and means responsive to a predetermined counter in said counter for transferring a new group of signals to said counter and for changing the logic operation of said control means to cyclically trigger the stages of the output register which correspond to $X^n$, where $n$ is the order of the digit represented by said new group and defined as $n \neq k$.

5. Apparatus for converting a number of radix X into pure binary code comprising, in combination; means providing binary coded input signals representing the digits of said number; a register comprising a plurality of cascaded binary trigger stages; means applying the input signals representing the lowest order digit of said number to the corresponding stages of said register; a settable counter connected to receive the others of said signals, digit-by-digit, on command; cyclically operative logic control means connected to trigger the stages in said register corresponding to $X^n$, where $n$ is the order of the digit last received by said counter, and for triggering said counter once each cycle; and means responsive to a predetermined count in said counter for transferring the input signals representing the next higher order digit into said counter and for changing the logic of said control means to cyclically trigger the stages of the register which correspond to $X^{n+1}$.

6. A binary coded decimal to pure binary translator comprising, in combination: means providing binary coded decimal input signals representing the digits of a number to be translated; a binary register; means applying the input signals representing the units digit of said number to the inputs of the corresponding stages in said register; a settable counter; means for transferring the input signals representing the ten's digit of said number to said counter; logic control means for cyclically and sequentially triggering those stages in said register which correspond in pure binary code to the decimal ten and for triggering said counter once for each complete cycle of operation of said control means; and means responsive to a predetermined count in said counter for transferring the signals representing the hundred's digit to said counter and for changing the logic operation of said control means to cyclically and sequentially trigger those stages in said register which correspond in pure binary code to the decimal one hundred.

7. A translator for translating a number having a radix X to its equivalent in pure binary form comprising, in combination: means providing binary coded input signals representing the digits of a number to be translated; a binary register; means simultaneously applying the input signals representing the lowest order digit of said number to the inputs of corresponding stages in said register; a settable counter; means for selectively transferring signals representing the higher order digits to said counter digit-by-digit, on command; logic control means cyclically operative to sequentially trigger those stages in said register which corresponding to $X^n$, where $n$ is the order of the digit last transferred to said counter, and for triggering said counter once for each cycle of operation of said control means; means responsive to a predetermined count in said counter for transferring signals representing the next higher order digit to said counter and for controlling the operation of said control means to cyclically trigger those stages in said register which correspond in value to the value of said next higher order digit; and means responsive to said predetermined count occurring after the final transfer of signals to said counter for disabling said control means.

References Cited by the Examiner

UNITED STATES PATENTS

| | | | |
|---|---|---|---|
| 2,864,557 | 12/1958 | Hobbs | 235—155 |
| 2,907,525 | 10/1959 | Hobbs et al. | 235—155 |
| 2,951,901 | 9/1960 | Rugaber et al. | 340—347 |

MALCOLM A. MORRISON, *Primary Examiner.*

DARYL W. COOK, *Examiner.*